United States Patent Office 3,212,875
Patented Oct. 19, 1965

3,212,875
ALKALI METAL PREPARATION BY DECOMPOSITION OF ORGANOMETALLIC COMPOUNDS
Charles W. Strobel, Bartlesville, Okla., assignor to Phillips Petroleum Company, a corporation of Delaware
No Drawing. Filed Dec. 31, 1962, Ser. No. 248,195
5 Claims. (Cl. 75—.5)

This invention relates to a process for the preparation of finely-divided alkali metal.

The employment of finely-divided alkali metals as catalysts is well known in the art. The employment of organoalkali metal catalysts prepared by either substitution or an adduction reaction of a finely-divided alkali metal with an organic compound is also well known in the art. Conventionally, finely-divided alkali metal dispersions are prepared by melting and mechanically dispersing the metal in an inert liquid having a boiling point higher than the melting point of the metal. As this is a mechanical dispersing technique, there is a lower limit on the size of particles that can be obtained therefrom. For example, one of the better lithium dispersions prepared mechanically by the Lithium Corporation of America has a disclosed particle size only "90 percent less than 25 microns." It would be desirable to be able to obtain alkali metal dispersions having a particle size substantially less than 25 microns.

Accordingly, an object of my invention is to provide a process for the production of finely-divided metals.

Another object of my invention is to provide a process for the production of finely-divided alkali metals.

Another object of my invention is to provide a process for the production of finely-divided alkali metals having a particle diameter size not greater than one micron.

Other objects, advantages and features of my invention will be readily apparent to those skilled in the art from the following description and appended claims.

I have discovered that atomically-dispersed alkali metal can be prepared from alkali metals having a melting point above 35° C. by the formation and decomposition of organoalkali metals. By the process of my invention, particle sizes of one micron and smaller are obtained. Although limited by the resolving power of available microscopes, it is believed that the process of my invention, involving as it does the decomposition of an organoalkali metal compound, results in an atomic dispersion of the metal.

The alkali metals that can be employed for the process of my invention are lithium, sodium, potassium and rubidium. The metal can be utilized in any form desired, such as wire, chunk, or shot. The organo-metal adducts that are formed and decomposed to give the atomically-dispersed metal of my invention are obtained by reacting the alkali metal with either a polycyclic aromatic compound or a polyaryl-subsituted ethylene.

The polycyclic aromatic compounds that can be reacted with the alkali metal preferably include condensed ring aromatic compounds such as naphthalene, anthracene, and phenanthrene; alkyl-subsituted condensed ring aromatics in which the alkyl groups contain a total of from 1 to 6 carbon atoms, such as 1-methyl-naphthalene, 1-tert-butylnaphthalene, 2 - amylnaphthalene, 2,4-di-n-propyl-naphthalene, 9-methylanthracene, 1-ethylanthracene, 1,4,5-triethylanthracene, 2,7-dimethylphenanthrene, and the like; other polycyclic aromatic compounds such as biphenyls, terphenyls, dinaphthyl, and the like; and mixtures of these compounds. The polyaryl-substituted ethylenes that can be reacted with the alkali metal include those compounds that contain 2, 3 or 4 aryl groups such as phenyl and/or naphthyl. Examples are 1,1-diphenyl-ethylene, 1,2-diphenylethylene (stilbene), triphenylethylene, tetraphenylethylene, 1-phenyl-1-naphthylethylene, 1,2-dinaphthylethylene, 1,1 - diphenyl-2-naphthylethylene, trinaphthylethylene, and the like.

The finely-divided alkali metal dispersions of my invention can be prepared in polar dispersing media, hereinafter referred to as solvents, inert to the process, such as ethers, and in hydrocarbon dispersing media, hereinafter referred to as solvents. Solvents having boiling points below about 125° C. can be used, and those boiling below about 50° C. are preferred for ease of removal at the completion of the reaction. Suitable hydrocarbon solvents include propane, isobutane, n-pentane, isooctane, cyclopentane, methylcyclopentane, ethylcyclopentane, cyclohexane, methylcyclohexane, benzene, toluene, and the like. Examples of suitable polar solvents are the ethers, thioethers, and tertiary amines. Examples of the ethers are dimethyl ether, diethyl ether, diisopropyl ether, di-n-propyl ether, ethyl isobutyl ether, furan, phenetole, anisole, and the like. Examples of the thioethers are dimethylsulfide, diethylsulfide, methyl ethyl sulfide, methyl n-propyl sulfide, and the like. Examples of the tertiary amines are trimethylamine, triethylamine, methyl-diethyl-amine, and the like.

The alkali metal is reacted with the organic compound at a temperature in the range from 35° C. up to the melting point temperature of the alkali metal. The pressure in the reaction zone is that pressure required to maintain the materials other than the metal substantially in liquid phase. The metal is maintained in the solid phase throughout the reaction. The time of reaction will range from 1 minute to 30 days, preferably 1 hour to 10 days.

The molarity of the adduct-forming organic compound in the solvent selected is in the range of 0.01 to 10, preferably in the range of 0.05 to 5. It is preferred that at least one gram atom of alkali metal be utilized for each gram mole of adduct-forming organic compound, although an excess of the alkali metal can be employed. This ratio is not critical as it appears that the formation of the finely-divided metal from the adduct regenerates the adduct-forming organic compound for reuse.

The reaction of the organic compound with an alkali metal to form an alkali-metal adduct occurs at relatively low reaction temperatures and short reaction times with relatively more severe conditions such as higher temperatures and longer reaction times favoring the formation of extremely finely-divided alkali metal. When conducting the reaction at a temperature within the range of 35° C. up to the melting point temperature of the alkali metal, the recovery of finely-divided alkali metal is increased by increasing the time of reaction until all of the alkali metal has reacted to form finely-divided alkali metal.

The term "finely-divided alkali metal" refers to alkali metal particles having a maximum diameter of one micron. The degree of completion of the finely-divided alkali metal preparation process can be readily determined by separating the unreacted metal by, for example, filtering the reaction mixture so as to remove solid particles having a particle diameter greater than one micron or otherwise separating the unreacted material and titrating a sample portion of the filtered reaction mixture with hydrochloric acid to determine total alkali-metal adduct plus alkali metal. The alkali metal concentration can be determined by reacting the filtered adduct-metal reaction mixture with water and analyzing the gas evolved for hydrogen. The quantity of the hydrogen evolved is a measure of the quantity of finely-divided alkali metal produced. A microscope can be employed to determine particle size of the alkali metal.

Conventional separation processes can be employed to recover the finely-divided alkali metal from the reaction mixture. For example, when employing a solvent, the solvent can be separated from the reaction mixture by a conventional fractionation step and the organic compound subsequently removed by a distillation step conducted under reduced pressure, maintaining the distillation temperature below the melting point temperature of the metal.

The finely-divided alkali metal prepared by the process of my invention can be utilized as a polymerization catalyst, said polymerization catalyst employed, for example, in the polymerization of a conjugated diolefin.

The following examples are presented as illustrative of the effectiveness of the inventive process. However, it is not intended that the invention should be limited thereto.

*Example I*

A reaction mixture of the following composition:

| | |
|---|---|
| Ethyl ether ml | 23.5 |
| Mixed methylnaphthalenes g | 7.1 |
| Lithium wire g | 1.0 | was prepared and charged to a reactor bottle. The bottle was purged with nitrogen, capped with a rubber and punched-crown cap, and pressured to 25 p.s.i.g., with nitrogen. The bottle was then tumbled in a constant temperature bath maintained at $-26°$ C. for a period of 46 hours.

The reaction mixture was sampled and the total lithium normality (lithium adduct plus lithium metal) was determined by titration with 0.1 N-hydrochloric acid. Lithium metal was determined by reacting the adduct-metal mixture with water and analyzing the gas evolved for hydrogen.

At the end of 22 hours, titration of a syringe-taken sample indicated that the reaction mixture was 3.56 normal in total lithium. The syringe sampling procedure of this and succeeding examples necessarily involved the separation of the unreacted metal at the time of sampling. At the end of 46 hours, the sampled product was found to be 3.72 normal in total lithium and 0.02 normal or less in lithium metal. This clearly indicates that at $-26°$ C., finely-divided lithium metal was not obtained from a reaction mixture comprising lithium metal, mixed methylnaphthalenes and ethyl ether.

*Example II*

The procedure of Example I was repeated with the exception that the constant temperature bath was maintained at 30° C. The results obtained indicated that substantially no lithium metal was found.

Examples I and II illustrate that essentially only the organolithium adduct is obtained at temperatures of $-26°$ C. and 30° C.

*Example III*

The procedure of Example I was repeated with the exception that the constant temperature bath was maintained at 50° C. Upon sampling the reaction mixture, the following lithium normalities were obtained:

| Time, Hours | Normality | |
|---|---|---|
| | Total | Metal |
| 21 | 1.28 | |
| 45 | 4.36 | |
| 70a | 7.66 | +5.61 |

(a) Lithium metal all reacted.

*Example IV*

A reaction mixture was prepared having the following composition:

| | |
|---|---|
| Ethyl ether ml | 23.5 |
| Mixed methylnaphthalenes g | 0.23 |
| Lithium wire g | 2.0 |

The reactor materials were charged to a reactor bottle, the bottle was purged with nitrogen, capped with a rubber and a punched-crown cap, and pressurized to 25 p.s.i.g. with nitrogen. The bottle was then tumbled in a constant temperature maintained at 50° C. for a period of 10 days. Sampling prior to the end of the test was done by syringe through the rubber cap. The total lithium normality was determined by titration with 0.1 N-hydrochloric acid. Lithium metal was determined by reacting the adduct-metal mixture with water, and analyzing the gas evolved for hydrogen. The following lithium normalities were obtained:

| Time, Days | Normality | |
|---|---|---|
| | Total | Metal |
| 3 | 1.8 | |
| 7 | 3.0 | |
| 10 | 3.9 | 3.7 (minimum). |

Examples III and IV illustrate the preparation of catalyst containing 73 and 95 weight percent lithium metal, respectively.

*Example V*

A reaction mixture was prepared having the following composition:

| | |
|---|---|
| Ethyl ether ml | 23.5 |
| Mixed methylnaphthalenes g | 7.1 |
| Lithium wire g | 2.7 |

The reaction mixture was charged to a reactor bottle, the bottle was purged in nitrogen, capped with a rubber and a punched-crown cap, and pressurized to 25 p.s.i.g. with nitrogen. The bottle was then tumbled in a constant temperature bath maintained at 50° C. for a period of 72 hours. Sampling prior to the end of the test was done by syringe through the rubber cap. Total lithium normalities were determined as in the previous examples by titration with 0.1 N-hydrochloric acid. Lithium metal was determined by reacting the adduct-metal mixture with water and analyzing the gas evolved for hydrogen. The following lithium normalities were obtained after the enumerated reaction times:

| Time, Hours | Normality | |
|---|---|---|
| | Total | Metal |
| 48 | 5.7 | |
| 72 | 11.0 | 11.0 |

One milliliter of the lithium dispersion obtained after a reaction period of 72 hours was diluted with 150 ml. of mineral oil and examined under a microscope. Uniform, loose aggregates of about 5 microns in diameter were observed. When these loose aggregates were touched with a probe, they fell apart into particles 1 micron or less in size. Although not possible to determine particle sizes smaller than 1 micron with the visual microscope, it appeared that the 1-micron particles were probably aggregates of atomic-size particles.

As will be evident to those skilled in the art, various modifications of this invention can be made, or followed, in the light of the foregoing disclosure and discussion without departing from the spirit or scope thereof.

I claim:

1. A process which comprises contacting in a reaction zone an alkali metal selected from the group consisting of lithium, sodium, potassium and rubidium with a component selected from the group consisting of polycyclic aromatic compounds selected from the group consisting of condensed ring aromatic compounds, alkyl-substituted condensed ring aromatics in which the alkyl groups contain a total of from 1 to 6 carbon atoms, biphenyls, terphenyls, dinaphthyl, and a polyaryl-substituted ethylene containing from 2 to 4 aryl groups, and mixtures thereof, in an inert solvent, maintaining the temperature in said reaction zone in the range of 35° C. up to the melting point of said alkali metal, maintaining said alkali metal in the solid phase, maintaining contact in said reacton zone for a sufficent length of time to form finely-divided alkali metal, and withdrawing from said reaction zone finely-divided alkali metal.

2. The process of claim 1 wherein the reaction period is in the range from 1 minute to 30 days.

3. The process of claim 2 wherein said alkali metal is lithium, said component is mixed methyl naphthalenes, and said solvent is ethyl ether.

4. The process of claim 2 wherein the concentration of said alkali metal in said reaction zone is at least 1 gram atom of said alkali metal for each gram mole of said component.

5. The process of claim 4 wherein the molarity of said component in said solvent is in the range of 0.01 to 10.

References Cited by the Examiner

UNITED STATES PATENTS

| 2,125,401 | 8/38 | Scott | 260—665 |
| 2,751,288 | 6/56 | Corneil | 75—0.55 |

OTHER REFERENCES

Coates: Organo-Metallic Compounds, John Wiley and Sons, Inc., New York, 2nd ed., 1960, pp. 1–42.

Wooster: Organo-Alkali Compounds, Chemical Reviews, vol. 11, pp. 1–91, August 1932, relied on pp. 37–44 and 59.

BENJAMIN HENKIN, *Primary Examiner.*

JOHN R. SPECK, DAVID L. RECK, *Examiners.*